United States Patent
Sim et al.

(10) Patent No.: US 7,638,976 B2
(45) Date of Patent: Dec. 29, 2009

(54) LITHIUM ION BATTERY AND METHOD OF POWER CONSERVATION FOR THE SAME

(75) Inventors: Sesub Sim, Yongin-si (KR); Jongwoon Yang, Yongin-si (KR); Segawa Susumu, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 500 days.

(21) Appl. No.: 11/525,230

(22) Filed: Sep. 20, 2006

(65) Prior Publication Data

US 2007/0090792 A1 Apr. 26, 2007

(30) Foreign Application Priority Data

Sep. 20, 2005 (KR) .................. 10-2005-0087316

(51) Int. Cl.
*H02J 7/00* (2006.01)
(52) U.S. Cl. ...................... 320/134; 320/132
(58) Field of Classification Search .......... 320/132–136
See application file for complete search history.

(56) References Cited

U.S. PATENT DOCUMENTS 6,492,791 B1 * 12/2002 Saeki et al. ................ 320/135
6,545,447 B1 * 4/2003 Smith ........................ 320/132

FOREIGN PATENT DOCUMENTS

JP 4-29532 1/1992
JP 10-136574 5/1998

OTHER PUBLICATIONS

Patent Abstracts of Japan; Publication No. 04-029532; Publication Date: Jan. 31, 1992; in the name of Miyazaki.
Patent Abstracts of Japan; Publication No. 10-136574; Publication Date: May 22, 1998; in the name of Hayashi et al.

* cited by examiner

*Primary Examiner*—Edward Tso
*Assistant Examiner*—Richard V Muralidar
(74) *Attorney, Agent, or Firm*—Christie, Parker & Hale, LLP

(57) ABSTRACT

A lithium ion battery and a method of power conservation for the same are provided. A bare cell including an electrode assembly with a plurality of electrodes and a protective circuit are coupled together via the plurality of electrodes. The protective circuit includes a remaining charge control circuit that internally detects a long-term nonuse state of the lithium ion battery and blocks current between the bare cell and the protective circuit when the long-term nonuse state is detected. The method includes: detecting whether the battery is used as a power source for an external instrument; determining and recording a value of an accumulated nonuse time when the lithium ion battery was not used as a power source; and blocking an internal current and converting the battery to a long-term nonuse mode when the value of the accumulated nonuse time is above a value indicative of a predetermined time.

6 Claims, 3 Drawing Sheets

LITHIUM ION BATTERY AND METHOD OF POWER CONSERVATION FOR THE SAME

CROSS-REFERENCE TO RELATED APPLICATIONS

This application claims priority to and the benefit of Korean Patent Application No. 10-2005-0087316, filed on Sep. 20, 2005, in the Korean Intellectual Property Office, the entire content of which is incorporated herein by reference.

BACKGROUND

1. Field of the Invention

The present invention relates to batteries, and more particularly, to a lithium ion battery and to a method of power conservation for the lithium ion battery.

2. Description of the Related Art

In conventional lithium ion batteries, most bare cells are formed by integrating an electrode assembly including a positive electrode, a negative electrode and a separator together with an electrolyte into a case and sealing the case. The bare cell can be charged and discharged and there are many factors that may make a bare cell hazardous for the consumer. For example, if over-discharging has occurred, then the battery itself cannot be used. And in the case of over-charging, if damage to the inside or if short-circuit has occurred, the battery cannot be used, and the battery can ignite or explode, thus causing a significant safety hazard.

Typically, the protective circuit in the lithium ion battery solves over-discharging or over-charging problems arising during general charging and discharging operations. However, the problem of over-discharging in the lithium ion battery can also arise from nonuse of the lithium ion battery for a long term.

Discharging of the battery occurs via a leakage current of the battery. Particularly, in a lithium secondary battery with a protective circuit, there is a certain power that is consumed by the protective circuit itself, even in the state when no external load is applied. Accordingly, if the lithium ion battery is unused for a long term, then the battery is in over-discharging state by an electric leakage of the battery and the power consumption of the protective circuit. Accordingly, the chargeable and dischargeable capacity of the battery will be deteriorated.

SUMMARY OF THE INVENTION

In one embodiment of the present invention, a lithium ion battery is provided. The battery includes: a bare cell including an electrode assembly in a case, the electrode assembly having a plurality of electrodes and a separator for preventing a short circuit between the a plurality of electrodes; and a protective circuit coupled to the plurality of electrodes, wherein the protective circuit includes a remaining charge control circuit that internally detects a long-term nonuse state of the lithium ion battery and blocks a current between the bare cell and the protective circuit when the long-term nonuse state is detected.

In some embodiments, the remaining charge control circuit includes: a state-recognition part adapted to determine and recognize the long-term nonuse state; and a conversion device part. The conversion device part is adapted to block the current between the bare cell and the protective circuit in response to a determination result obtained through the state-recognition part; and convert the battery to a resting state.

In some embodiments, the state-recognition part of the lithium ion battery is adapted to determine the long-term nonuse state of the lithium ion battery for a predetermined time. The lithium ion battery includes: a current detection sensor part adapted to detect whether a current has flowed through one or more external terminals of the battery in the predetermined time; a communication circuit part adapted to detect a communication signal has been transmitted through one or more of the external terminals of the battery in the predetermined time; and a timer adapted to determine whether the predetermined time has elapsed.

In various embodiments, the conversion device part includes an internal current breaker adapted to block an internal current between the bare cell and the protective circuit according to a determination of the state-recognition part.

In other embodiments, the conversion device part includes a circuit element adapted to detect when a charging voltage above a predetermined level is applied to the one or more external terminals and connect a switch in the internal current breaker.

In some embodiments, the remaining charge control circuit includes: a microprocessor, which includes: a timer adapted to measure an elapsed time; an accumulator adapted to accumulate the elapsed time as an accumulated time; a register adapted to receive at least one of a value of the accumulated time or a value of a voltage applied to the microprocessor; and a comparator adapted to compare at least one of the value of the accumulated time or the value of the voltage received in the register with a previously input value of a reference time or a reference voltage.

In various embodiments, the remaining charge control circuit includes an inner current breaker coupled between the bare cell and the microprocessor, the inner current breaker being closed when a voltage above a predetermined voltage is applied from the bare cell, and the inner current breaker being opened in response to a predetermined signal output from the microprocessor.

In some embodiments, the remaining charge control circuit includes: an inner current breaker coupled between the bare cell and the protective circuit, wherein the inner current breaker includes a switch circuit including a first cutoff switch and a second cutoff switch coupled in parallel, the first cutoff switch being adapted to be turned on by a high-voltage signal from a charger and the second cutoff switch being adapted to be turned off a predetermined signal of the microprocessor.

In various embodiments, the remaining charge control circuit includes: an inner current breaker coupled between the bare cell and the protective circuit, wherein the inner current breaker includes a switch circuit including a first cutoff switch and a second cutoff switch coupled in parallel, the first cutoff switch being adapted to be turned on by a high-voltage signal from a charger and the second cutoff switch being adapted to be turned on by a high voltage signal from a terminal of the bare cell.

In some embodiments, the inner current breaker is adapted to be converted from being turned off to being turned on by receiving a charging voltage having a value above a value of a predetermined voltage.

In another embodiment of the present invention, a method of power conservation for a lithium ion battery is provided. The method includes: detecting periodically by a current detection sensor part or a communication circuit part whether the battery is used as a power source for an external instrument; determining and recording a value of an accumulated nonuse time when the lithium ion battery was not used as a power source; and blocking an internal current adapted to flow between a bare cell and a protective circuit of the lithium ion battery and converting the lithium ion battery to a long-term nonuse mode by transmitting a current cutoff signal to an internal current breaker when the value of the accumulated nonuse time is above a value indicative of a predetermined time.

In some embodiments, the method also includes connecting the internal current breaker and converting to at least one of a use mode or a stand-by mode when a value of a charging voltage above a value of a predetermined voltage is applied to an external terminal.

In various embodiments, periodically whether the battery is used as a power source for the external instrument includes: determining whether a predetermined time has elapsed; and determining whether there is a current flowing through the external terminal.

In some embodiments, the method also includes determining whether there is a communication through the external terminal.

In some embodiments, converting the battery to the long-term nonuse mode includes determining whether a value of an internal voltage is below a value of a predetermined voltage after determining whether the value of the accumulated nonuse time is above the value indicative of the predetermined time and before opening the internal current breaker.

In another embodiment of the present invention, a lithium ion battery protective circuit adapted to conserve power in a lithium ion battery is provided. The lithium ion battery protective circuit includes: a means for detecting periodically by a current detection sensor part or a communication circuit part whether the battery is used as a power source for an external instrument; a means for determining and recording a value of an accumulated nonuse time when the battery was not used as a power source; and a means for blocking an internal current adapted to flow between a bare cell and a protective circuit of the battery and converting the battery to a long-term nonuse mode by transmitting a current cutoff signal to an internal current breaker when the value of the accumulated nonuse time is above a value indicative of a predetermined time.

DETAILED DESCRIPTION

Figure 1:
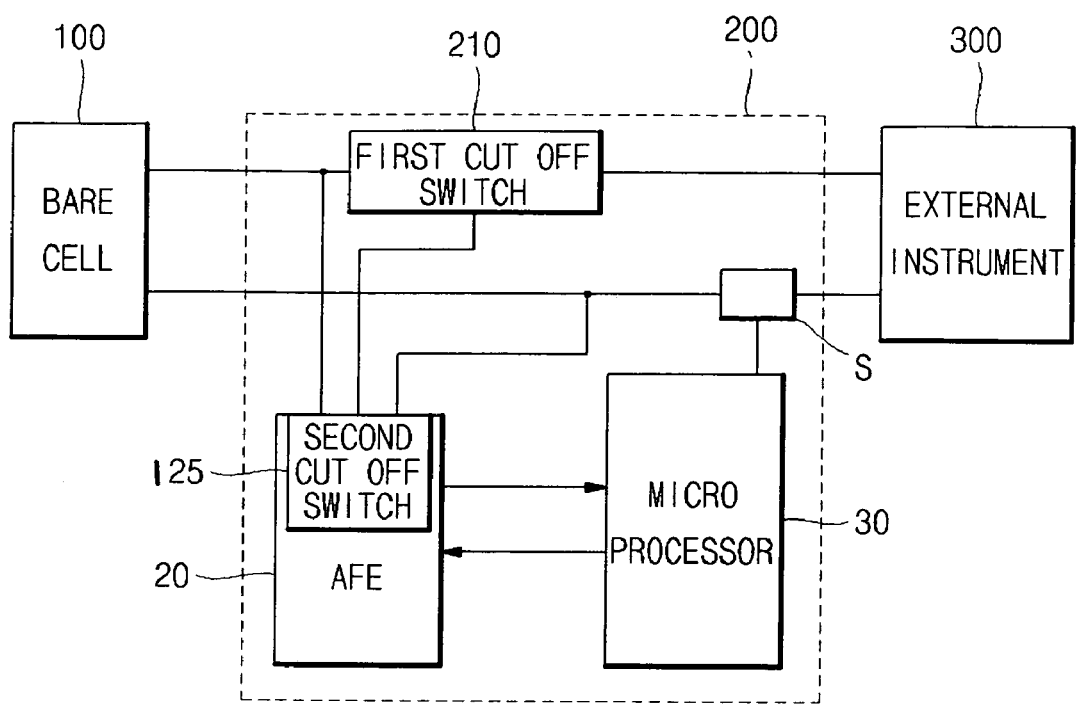
FIG. 1 is a block diagram illustrating a lithium ion battery with a bare cell and a protective circuit according to an embodiment of the present invention.

Referring to FIG. 1 the bare cell and an analog front end (AFE) within the protective circuit, the connection form of a microprocessor, and essential components of the microprocessor are as shown.

Referring to FIG. 1 an AFE 20 with a built-in second cutoff switch 125 is used as a current breaker in the present embodiment. The AFE 20 is typically a kind of level converter that processes an analog signal and then converts it to a voltage capable of being processed. In the present embodiment, the AFE 20 forms within protective circuit 200 a connection between a bare cell 100 and the protective circuit 200. The AFE 20 is connected to microprocessor 30 of the protective circuit 200 and controls a connection with an external terminal of the battery through a first cutoff switch 210 of the protective circuit. Accordingly the AFE forms a connection between the bare cell 100 and the microprocessor 30 and a connection between the bare cell 100 and an electrical terminal of an external instrument 300.

Typically, in the lithium ion battery, if an external cutoff voltage condition is reached, then an absence of remaining charge is recognized and the AFE 20 opens the first cutoff switch 210 in the path connecting the bare cell 100 to the external instrument 300 within the protective circuit, and thus a current cannot flow to the external instrument 300. However, an internal current for maintaining the function of the battery between the protective circuit 200 and the bare cell 100 flows in the inside of the battery.

According to the present embodiment, the AFE can block the internal current between the bare cell 100 and the protective circuit 200 by opening a second cutoff switch 125 by transmitting a predetermined to the microprocessor 30. Further, if a voltage signal applied to the AFE from the bare cell is low, then the AFE opens the second cutoff switch 125 and thus can block the internal current. Accordingly, a voltage of the bare cell 100 is applied to the AFE, and the AFE is configured to operate only at a voltage above a predetermined reference voltage.

When a charging capacity of the bare cell 100 is above a predetermined optimal capacity and a potential of a bare cell terminal has a potential difference above the reference operating voltage, then the AFE is operated. The second cutoff switch 125 of the AFE is closed by a charging potential difference applied to the external terminal of the battery in the reverse direction, and thus the battery is returned to the normal-use state or stand-by mode, and charging of the battery can be performed normally.

The reference operating voltage often corresponds to the state wherein the lithium ion battery is nearly discharged. When a voltage of the bare cell 100 is lowered from a high voltage to an external cutoff voltage by discharging to the external instrument and then is charged to the reference operating voltage of the AFE by using the internal current or by internal leakage, the AFE cannot be operated. Thus the internal current needed to maintain the general battery function cannot flow, but only extremely small quantities of minimal current and leakage current can flow.

In this case, current cannot flow in the battery; however, the bare cell 100 can be in a state wherein charging is not possible by a weak current flow such as a self-discharging current flow.

Figure 3:
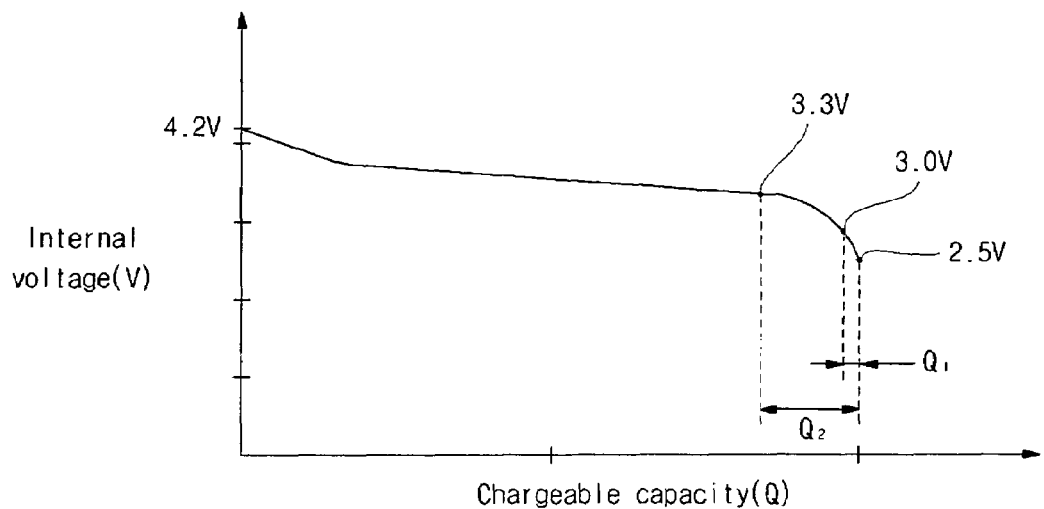
FIG. 3 is a graph illustrating a relationship between a capacity of the lithium ion battery and a voltage.

The aforementioned state can be readily with reference to FIG. 3, which illustrates the relationship between a capacity of the lithium ion battery and a voltage.

In the graph, the horizontal axis represents a chargeable capacity of the battery in the positive (+) direction and the vertical axis represents an internal voltage of the battery. It can be understood that the horizontal axis represents the remaining capacity of the battery in the negative (−) direction.

When the lithium ion battery is fully charged and thus the chargeable capacity thereof is zero, the internal voltage is 4.2 volts. Discharging of electricity causes a voltage drop. However, due to properties of the lithium ion battery, the voltage drop is sluggish and insignificant until a charging capacity is almost consumed. For example, when one-tenth of the chargeable capacity is remaining, the voltage is about 3.5 volts. In subsequent regions, however, the voltage drops steeply depending on the change of the chargeable capacity. Further, if the battery is completely discharged so that the voltage drops below a predetermined level, then it is hard to charge the battery because a negative electrode structure is changed irreversibly.

If the reference operating voltage of the AFE is set to 3 volts and the voltage of the battery drops below an operating voltage depending on the consumption of the remaining charge, since the second cutoff switch 125 of the AFE will be open and the remaining charge will be too low even in the state where a current for the function maintenance in the inside of the battery does not flow anymore, the period during which a certain level of leakage current keeps the battery chargeable (for example, 2.5 volts) is short though an internal minimal current flows.

However, if the second cutoff switch is opened at a certain voltage $V_0$, for example, 3.3 or 3.5 volts by the adjustment operation of the internal microprocessor 30, then the remaining charge in this state is approximately 10 times as much as the remaining charge at 3 volts. Accordingly, if the leakage current or minimum current of the same level flows in the battery, the period during which the battery remains chargeable will be increased by prolonged by 10 times.

Therefore, in order to extend the chargeable period of the lithium ion battery by more than a year, the operation of AFE with a substantial remaining charge may be shut down.

An output terminal of the AFE is connected to the microprocessor 30, and thus electric potential difference, which is a voltage signal, is transferred to the microprocessor 30. The voltage signal also serves to supply a driving power of the microprocessor.

Figure 2:
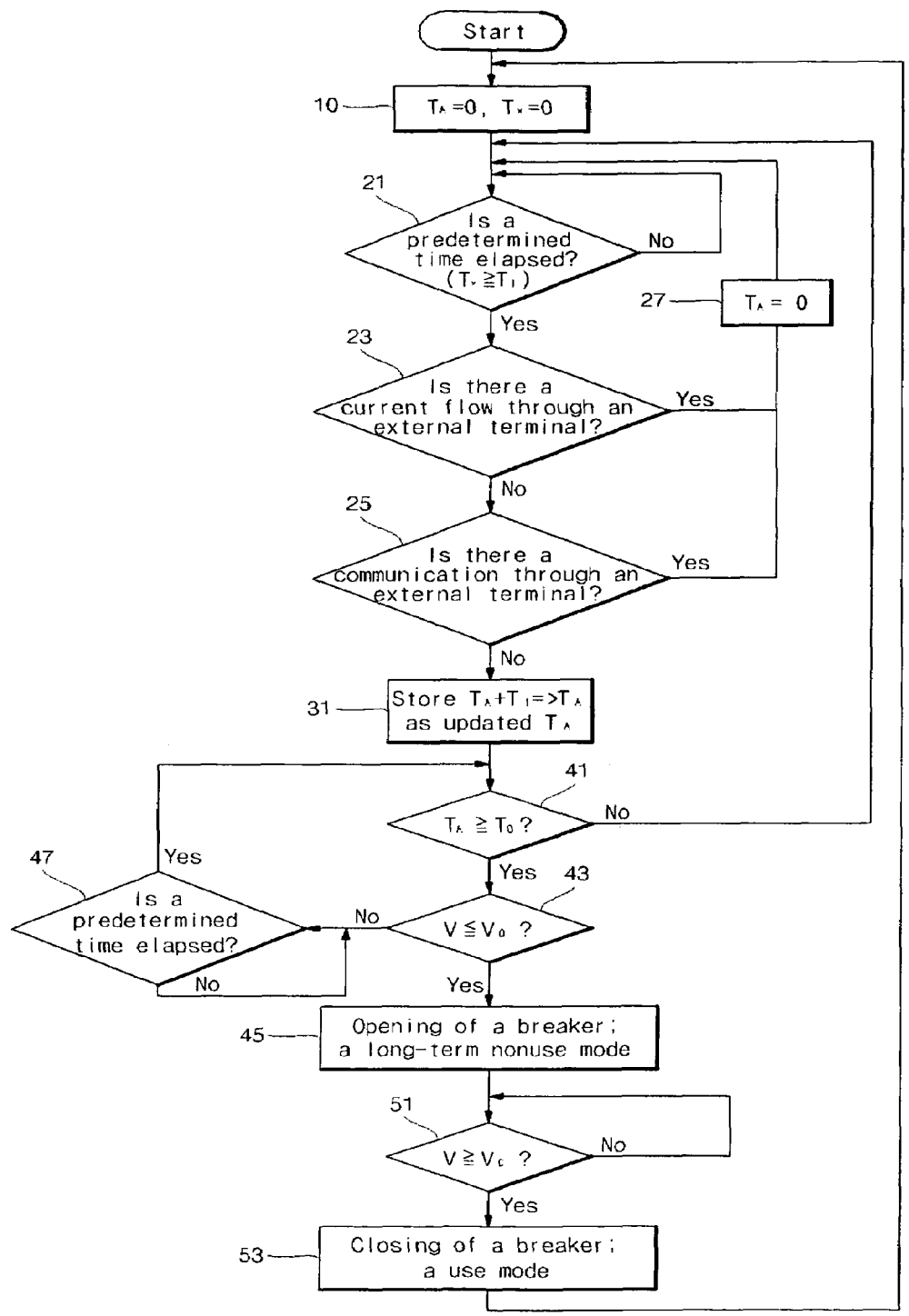
FIG. 2 is a flow chart illustrating operating steps of the protective circuit of the battery of FIG. 1 according to an embodiment of a method of the present invention.

Referring to FIG. 2, if the voltage signal is applied to the microprocessor 30, then a timer is initiated 10 for the accumulated time Ta and for Tx. It is determined 21 whether a predetermined time has elapsed by comparing Tx with a period of time $T_1$, by using the timer in the microprocessor of FIG. 1.

It is periodically and continually determined whether the battery is used. Further, it is also determined whether the remaining charge is above a predetermined level. For example, it is possible for the microprocessor to compute the remaining charge of the voltage signal transferred from the AFE output terminal and then compare it with the predetermined remaining charge using a comparator (i.e., a comparative circuit).

Next it is determined 23 whether a current has flowed through the external terminal in a predetermined period. It is also determined 25 whether an exchange of communication with a system (for example, a battery management system on which the battery is mounted). It is determined whether there is a current flow and a communication at a time interval corresponding to the period time T1 by using the timer in the microprocessor of FIG. 1.

When there is no current flow and no communication, it is possible to store 30 the accumulated return value in a register by continually adding the time $T_1$ corresponding to the period to the accumulated time $T_A$ in the accumulator of the microprocessor.

Alternately, the time accumulation for determining whether the battery is unused for a long term may require only the current flow to the outside as a regulating condition (in such a case step 25 is not present) or only communication through an external terminal as a regulating condition (in such a case step 23 is not present). For example, in a conservation state, the system sometimes communicates at a long time interval. In this case, since there is a possibility for the system to determine if the battery is used due to the communication having a long time interval, it is possible to demand the current flow only as a regulating condition without considering the communication as a determination factor.

Furthermore, in some embodiments the time accumulation is updated and stored only if there is no current flow or communication. If the current flow or the communication is present during a certain period, the resulting value of the accumulator is set 27 to 0 and the accumulated time $T_A$ and the result value are continually stored.

The value of the accumulated time $T_A$ is compared 41 with a predetermined input period. To which may be, for example, 1 month. It is determined 47 whether the accumulated time $T_A$ is longer then the input period $T_0$ When the accumulated time $T_A$ is longer than the input period T0, the battery is considered as being in a state of nonuse, and the microprocessor opens the switch 25 in the AFE by a communication cable connected to the AFE. This therefore blocks the current flow between the bare cell 100 and the protective circuit 200.

Before blocking the current flow, it is determined 43 whether the remaining charge is below a predetermined value. If not, a step is performed which determines the accumulated time periodically, using step 47. However, the remaining charge and the internal voltage are set to the value that keeps the battery chargeable for a long term. In addition, in embodiments wherein there is no determination step 43, the method may include turning the first cutoff switch off before the internal current flow is shut down by the second cutoff switch.

If a charging voltage Vc is above a predetermined voltage and is applied to the external terminal after step 51, the second cutoff switch 25 the circuit is closed 53 and therefore the current between the bare cell and the protection circuit flows. When this occurs, the first cutoff switch is also connected when the external charging voltage is applied.

Figure 4:
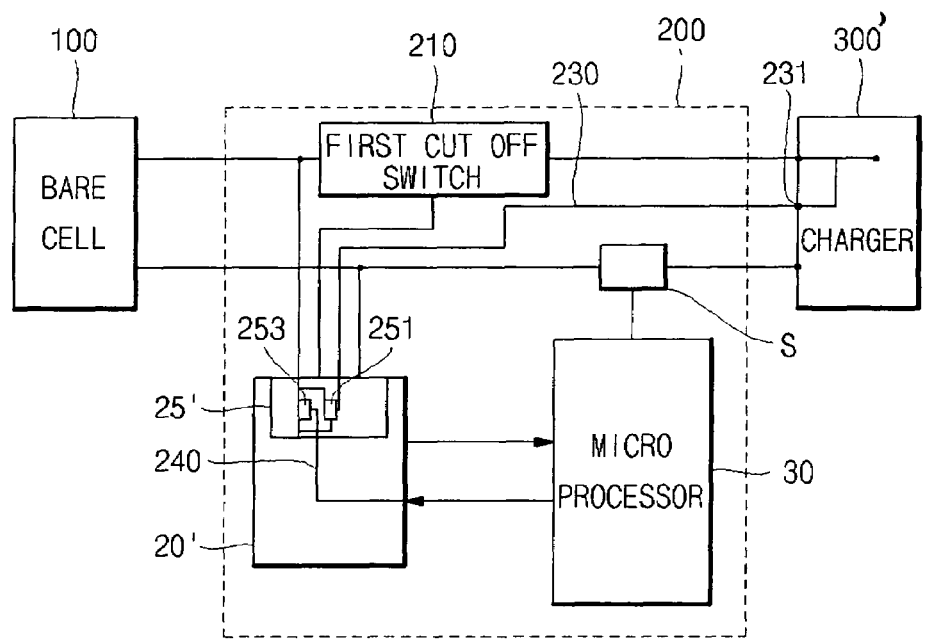
FIG. 4 is a block diagram illustrating a further exemplary embodiment of the present invention.

Referring to FIG. 4 switches 251 and 253 are arranged in parallel on one path connecting the bare cell 100 and the protective circuit 200 within an AFE 20'. Each of these switches may be a field effect transistor (FET) type of switch. When a high-voltage signal is applied to only one of the switches, both of them remain on. In one embodiment the gates of the two FET switches are coupled to an external terminal 231 of the microprocessor charger 300'. The external terminal 231 is brought into contact with the high-voltage terminal from the charger. One terminal of the microprocessor 30 generates a predetermined signal as a further embodiment of the present invention when the voltage of the bare cell is below a predetermined voltage. It is possible to turn off the switch 253, which connects the bare cell 100 and the protective circuit 200, by sending a low-voltage signal to the gate of switch 253. It is also possible to connect the gate of switch 253 by diverging the high-voltage terminal cable of the bare cell 100, instead of the one terminal of the microprocessor 30.

Once external terminal 231 is separated from the charger, there is no connection, and thus one switch 251, which is connected to the one external terminal 231 by the cable 230 is turned off. However, the other switch 253 can remain on when the voltage of the high-voltage terminal of the bare cell is high enough.

Thereafter, when the battery discharges electricity due to contact with an electric instrument or when the voltage level drops due to internal consumption, the first cutoff switch 210 of the protective circuit 200 is shut down. Further, as the voltage level of the high-voltage terminal of the bare cell 100 drops, a voltage below a predetermined value is transmitted from the second cutoff switch 25' to the FET switch 253 by a predetermined signal of the microprocessor 30 or according to the level drop of the high-voltage terminal of the bare cell. Accordingly, the corresponding switch 253 is opened, and the current flow between the protective circuit 200 and the bare cell 100 is blocked except for the leakage current. Therefore, the battery is converted to a long-term nonuse mode and is kept chargeable with the low current consumption.

According to the embodiment of the present invention, the blocking of the internal current and the conversion to long-term nonuse mode is performed by the battery's own internal logic instead of an external signal.

In some embodiments, a current of 3 to 4 mA flows in the use mode of the lithium ion battery, and a current of 200 to 400 µA flows in the stand-by mode, even if the requirement of the instrument are different. The current below about 2 µA flows in the long-term nonuse mode or the shutdown mode. Therefore, it is possible to prolong the conservation time by 100 times as much as that of the ordinary stand-by mode where there is no conversion to the shutdown mode. Converting from the stand-by mode to the long-term nonuse mode is one way to prolong the chargeable period.

Since the detailed structures of the accumulator, the register, the timer, the microprocessor having the comparative circuit, the AFE used as the current breaker, the current detection sensor and the communication circuit part are known to a person skilled in the art, and the present invention is characterized in that the detection of the long-term nonuse state and conversion of mode are made possible by combining the aforementioned parts, the specific circuit is not described in the detailed description.

The nonuse reference period or the remaining charge will be recorded in the microprocessor, etc., by adding and subtracting according to the usage of the battery.

According to the present invention, the lithium ion battery can maintain a chargeable state even when unused without charging for a long term. In some embodiments, the long-term period is in excess of a year. In particular, the chargeable state of the battery can be maintained by the charge control circuit of the protective circuit without an external input.

Although exemplary embodiments of the present invention have been described for illustrative purposes, those skilled in the art will appreciate that various modifications, additions and substitutions are possible, without departing from the scope and spirit of the invention as disclosed in the accompanying claims and their equivalents.

What is claimed is:

1. A method of power conservation for a lithium ion battery, the method comprising:
    detecting periodically by a current detection sensor part or a communication circuit part whether the lithium ion battery is used as a power source for an external instrument;
    determining and recording a value of an accumulated nonuse time when the lithium ion battery was not used as a power source; and
    blocking an internal current adapted to flow between a bare cell and a protective circuit of the lithium ion battery and converting the lithium ion battery to a long-term nonuse mode by transmitting a current cutoff signal to an internal current breaker when the value of the accumulated nonuse time is above a value indicative of a predetermined time.

2. The method as claimed in claim 1, further comprising:
    connecting the internal current breaker and converting to at least one of a use mode or a stand-by mode when a value of a charging voltage above a value of a predetermined voltage is applied to an external terminal.

3. The method as claimed in claim 1, wherein detecting periodically whether the lithium ion battery is used as a power source for the external instrument comprises:
    determining whether a predetermined time has elapsed; and
    determining whether there is a current flowing through the external terminal.

4. The method as claimed in claim 2, further comprising determining whether there is a communication through the external terminal.

5. The method as claimed in claim 1, wherein converting the lithium ion battery to the long-term nonuse mode comprises determining whether a value of an internal voltage is below a value of a predetermined voltage after determining whether the value of the accumulated nonuse time is above the value indicative of the predetermined time and before opening the internal current breaker.

6. A lithium ion battery protective circuit adapted to conserve power in a lithium ion battery, the lithium ion battery protective circuit comprising:
    a means for detecting periodically by a current detection sensor part or a communication circuit part whether the lithium ion battery is used as a power source for an external instrument;
    a means for determining and recording a value of an accumulated nonuse time when the lithium ion battery was not used as a power source; and
    a means for blocking an internal current adapted to flow between a bare cell and a protective circuit of the lithium ion battery and converting the lithium ion battery to a long-term nonuse mode by transmitting a current cutoff signal to an internal current breaker when the value of the accumulated nonuse time is above a value indicative of a predetermined time.

* * * * *

UNITED STATES PATENT AND TRADEMARK OFFICE
CERTIFICATE OF CORRECTION

PATENT NO. : 7,638,976 B2  Page 1 of 1
APPLICATION NO. : 11/525230
DATED : December 29, 2009
INVENTOR(S) : Sim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Ninth Day of November, 2010

David J. Kappos
*Director of the United States Patent and Trademark Office*